(12) United States Patent
Matsumura et al.

(10) Patent No.: US 6,792,045 B2
(45) Date of Patent: Sep. 14, 2004

(54) IMAGE SIGNAL TRANSCODER CAPABLE OF BIT STREAM TRANSFORMATION SUPPRESSING DETERIORATION OF PICTURE QUALITY

(75) Inventors: Tetsuya Matsumura, Hyogo (JP); Toyohiko Yoshida, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 388 days.

(21) Appl. No.: 09/769,415

(22) Filed: Jan. 26, 2001

(65) Prior Publication Data

US 2001/0010707 A1 Aug. 2, 2001

(30) Foreign Application Priority Data

Jan. 31, 2000 (JP) ...................................... 2000-022541

(51) Int. Cl.[7] ............................................... H04N 7/12
(52) U.S. Cl. ................................................. 375/240.1
(58) Field of Search ....................... 375/240.01, 240.02, 375/240.03, 240.1, 240.11, 240.12, 240.13–240.16, 240.25, 240.26, 240.28, 240.29; 348/397.1–399.1, 390.1, 424.1, 424.2, 425.1, 425.3, 425.4, 426.1, 441, 452; 382/233–236, 238–239; 386/27, 33, 109, 111–112; H04N 7/12

(56) References Cited

U.S. PATENT DOCUMENTS

| | | | | |
|---|---|---|---|---|
| 6,151,361 A | * | 11/2000 | Perlman | 375/240.03 |
| 6,160,844 A | * | 12/2000 | Wilkinson | 375/240 |
| 6,285,716 B1 | * | 9/2001 | Knee et al. | 375/240.28 |
| 6,421,385 B1 | * | 7/2002 | Uenoyama et al. | 375/240.2 |
| 6,516,135 B1 | * | 2/2003 | Higuchi et al. | 386/112 |
| 6,549,671 B1 | * | 4/2003 | Miyagoshi et al. | 382/239 |
| 2003/0043923 A1 | * | 3/2003 | Zhang et al. | 375/240.27 |
| 2003/0067989 A1 | * | 4/2003 | Yoshinari | 375/240.25 |
| 2003/0091332 A1 | * | 5/2003 | Higuchi et al. | 386/68 |

FOREIGN PATENT DOCUMENTS

| | | |
|---|---|---|
| EP | 0 779 744 | 6/1997 |
| JP | 9-214979 | 8/1997 |
| JP | 11-252566 | 9/1999 |

OTHER PUBLICATIONS

Wee et al, "Efficient processing of compressed video", Conference Record of the Thirty–Second Asilomar Conference on Signal, Systems & Computers, vol. 1, pp. 853–857, Nov. 1998.*

"MPEG Digital Video–Coding Standards", IEEE Signal Processing Magazine, pp. 82–100, Sep. 1997.*

"VTR Will Be Obsolete, Heated Competition for the Successor," by Harada et al., Nikkei Electronics, Sep. 6, 1999, pp. 107–116.

* cited by examiner

*Primary Examiner*—Young Lee
(74) *Attorney, Agent, or Firm*—McDermott Will & Emery LLP

(57) ABSTRACT

An MPEG2 decoder portion decodes an input bit stream and outputs a digital decoded image while extracting coding information and supplying the same to a control portion. An MPEG2 encoder portion re-encodes the digital decoded image output from the MPEG2 decoder portion. Coding information supplied from the control portion is reflected on a coding parameter in re-encoding. Transcoding between the MPEG2 standard and the DV standard can also be executed by arranging a decoder or an encoder corresponding to the DV standard in place of either the MPEG2 decoder portion or the MPEG2 encoder portion.

13 Claims, 12 Drawing Sheets

IMAGE SIGNAL TRANSCODER CAPABLE OF BIT STREAM TRANSFORMATION SUPPRESSING DETERIORATION OF PICTURE QUALITY

BACKGROUND OF THE INVENTION

1. Field of the Invention

The present invention relates to an apparatus for performing bit stream transformation for re-coding a temporarily decoded input image signal under a prescribed system (such a series of decoding and re-coding are hereinafter collectively referred to as transcoding), and more particularly, it relates to an image signal transcoder capable of executing transcoding on an input bit stream as to an image signal coded under the MPEG2 standard or the DV standard.

2. Description of the Background Art

In recent years, data processing of image signals such as video data remarkably tends to digitization. While an important point of digital data processing of image signals is compression coding according to a signal compression technique, the standards of compression coding systems for image signals (hereinafter also referred to as image compression systems) are not necessarily unified.

One of representative standards is the MPEG2 (Moving Picture Experts Group 2) standard employed for a public set-top box (STB) capable of receiving and reproducing digital broadcasting, a DVD-Video which is a DVD (Digital Versatile Disc) for movie/music video works, a DVD-RTR which is a recording/reproducing DVD and the like. The MPEG2 standard is described in literature "ISO-IEC/JTC1 SC29 DIS13818, Part 2, 1994" in detail.

A DVC (Digital Video Cassette) which is a public digital VTR employs a dedicated DV standard referred to as Mini DV as the image compression system. The DV standard is described in literature "SD Specifications of Consumer-Use Digital VCR", HD Digital VCR Conference, December 1994, in detail.

Such digitization of image data processing is conceivably further expanded in the future in consideration of transition of TV broadcasting to digitization, accessibility to other devices indispensable to formation of a home network and the like.

Such progress in digitization of signal processing increasingly leads to the necessity for an application product capable of treating the aforementioned image compression systems in fusion, i.e., an application product receiving a bit stream formed under each coding standard, decoding the bit stream and re-coding the decoded bit stream according to a prescribed image compression system thereby enabling storage of image data between media having different coding standards, i.e., different image compression systems.

For example, application of a VTR receiving an input bit stream according to the MPEG2 standard corresponding to a set-top box (STB), transcoding the bit stream to a different bit rate and writing the bit stream in a recording/reproducing DVD (DVD-RTR) is assumable. Therefore, transcoding between bit streams of image data under different coding standards or between bit streams of image data having different bit rates under the same coding standard.

Both of the MPEG2 standard and the DV standard referred to as the representative coding standards, which are not reversible coding systems (lossless coding systems), are subjected to some distortion in the process of compression and expansion. Consequently, a decoded image based on a bit stream once coded is deteriorated in picture quality as compared with the source image. When re-coding the deteriorated image, the picture quality may be further remarkably deteriorated depending on the coding system.

SUMMARY OF THE INVENTION

An object of the present invention is to provide an image signal transcoder capable of performing transcoding while suppressing deterioration of picture quality between coding standards identical to or different from each other.

Briefly stated, the present invention provides an image signal transcoder temporarily decoding an input bits stream of coded image signal and re-coding the image signal under a prescribed system, comprising a decoding processing portion, a coding processing portion and a control portion.

The decoding processing portion decodes the input bit stream according to a prescribed coding standard and outputs decoded image data while extracting coding information of the input bit stream. The coding processing portion re-codes the decoded image data under the prescribed coding standard and forms an output bit stream. The control portion sets a coding parameter in the re-coding on the basis of the coding information.

According to another aspect of the present invention, an image signal transcoder temporarily decoding an input bits stream of coded image signal and re-coding the image signal under a prescribed system comprises a decoding processing portion, a coding processing portion and a control portion.

The decoding processing portion decodes the input bit stream according to a first coding standard and outputs decoded image data while extracting coding information of the input bit stream. The coding processing portion re-codes the decoded image data under a second coding standard and forms an output bit stream. The control portion sets a coding parameter in the re-coding on the basis of the coding information.

Accordingly, a principal advantage of the present invention resides in that the coding parameter in the re-coding is set on the basis of the coding information obtained when decoding the input bit stream and hence deterioration of the picture quality following transcoding between identical coding standards can be suppressed.

Further, the coding parameter in the re-coding under the second coding standard is set on the basis of the coding information obtained when decoding the input bit stream according to the first coding standard and hence deterioration of the picture quality following transcoding between different coding standards can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described in detail with reference to the drawings.

As for transcoding of image signals described with reference to the embodiments of the present invention, the following three cases are assumed by way of illustration:

(1) transcoding between identical coding standards for decoding a bit stream coded under the MPEG2 standard and re-encoding the bit stream under the MPEG2 standard;

(2) transcoding between different coding standards for decoding a bit stream coded under the DV standard and re-encoding the bit stream under the MPEG2 standard; and (3) transcoding between different coding standards for decoding a bit stream coded under the MPEG2 standard and re-encoding the bit stream under the DV standard.

First Embodiment

With reference to a first embodiment of the present invention, an image signal transcoder 100 corresponding to the case (1) among the aforementioned three cases is described. The case (2) and (3) will be described in a fourth embodiment later.

Figure 1:
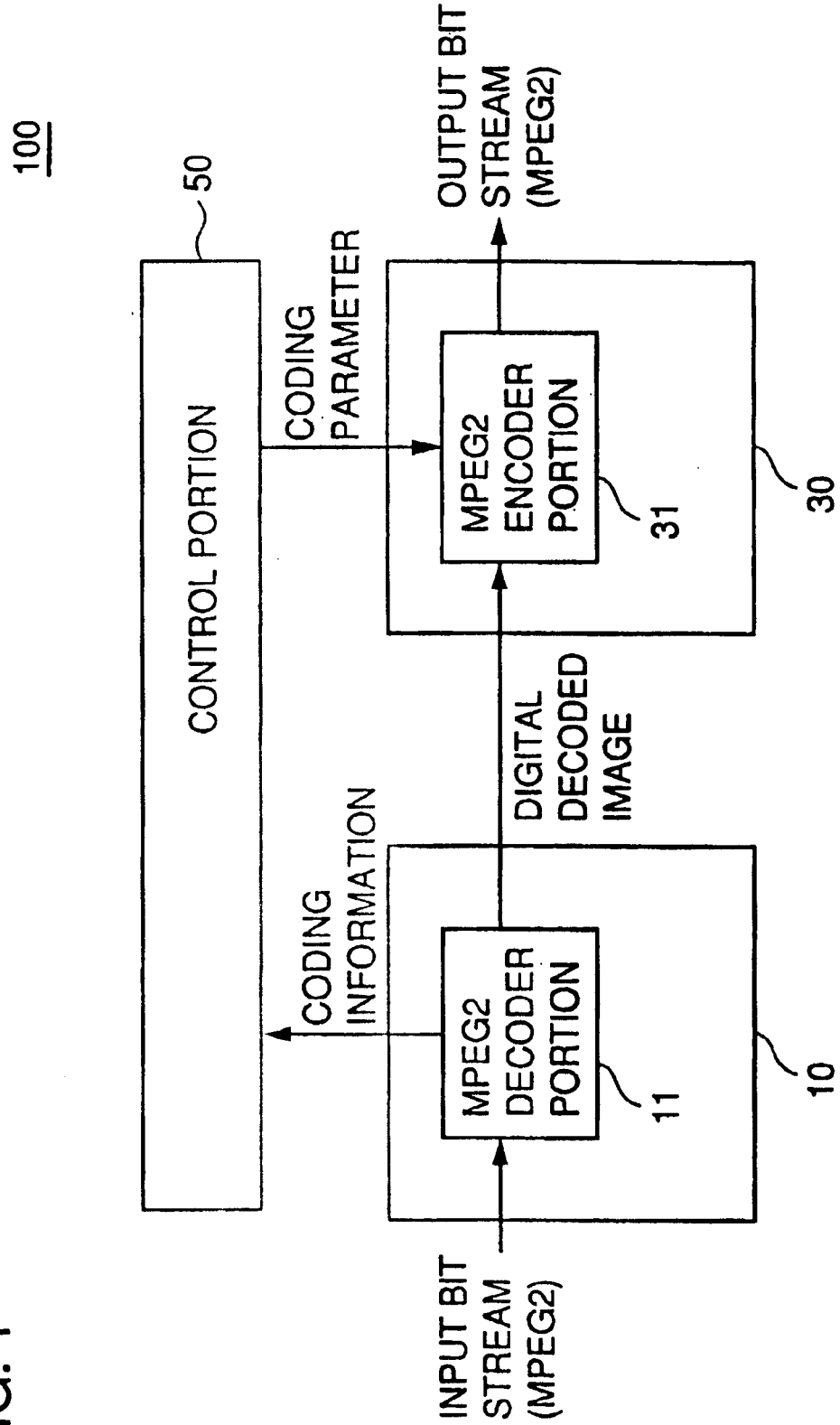
FIG. 1 is a schematic block diagram showing the structure of an image signal transcoder 100 according to a first embodiment of the present invention.

Referring to FIG. 1, the image signal transcoder 100 according to the first embodiment of the present invention comprises an MPEG2 decoding block 10 decoding an input bit stream encoded under the MPEG2 standard and transforming the same to a digital decoded image and an MPEG2 coding block 30 re-encoding the digital decoded image under the MPEG2 standard and forming an output bit stream.

The MPEG2 decoding block 10 and the MPEG2 coding block 30 include an MPEG2 decoder portion 11 and an MPEG2 encoder portion 31 executing actual decoding and actual re-encoding respectively.

The image signal transcoder 100 further comprises a control portion 50 having a function of holding coding information obtained in decoding in the MPEG2 decoder portion 11 and fitting the coding information to calculation of a coding parameter in re-encoding by the MPEG2 encoder portion 31.

Figure 2:
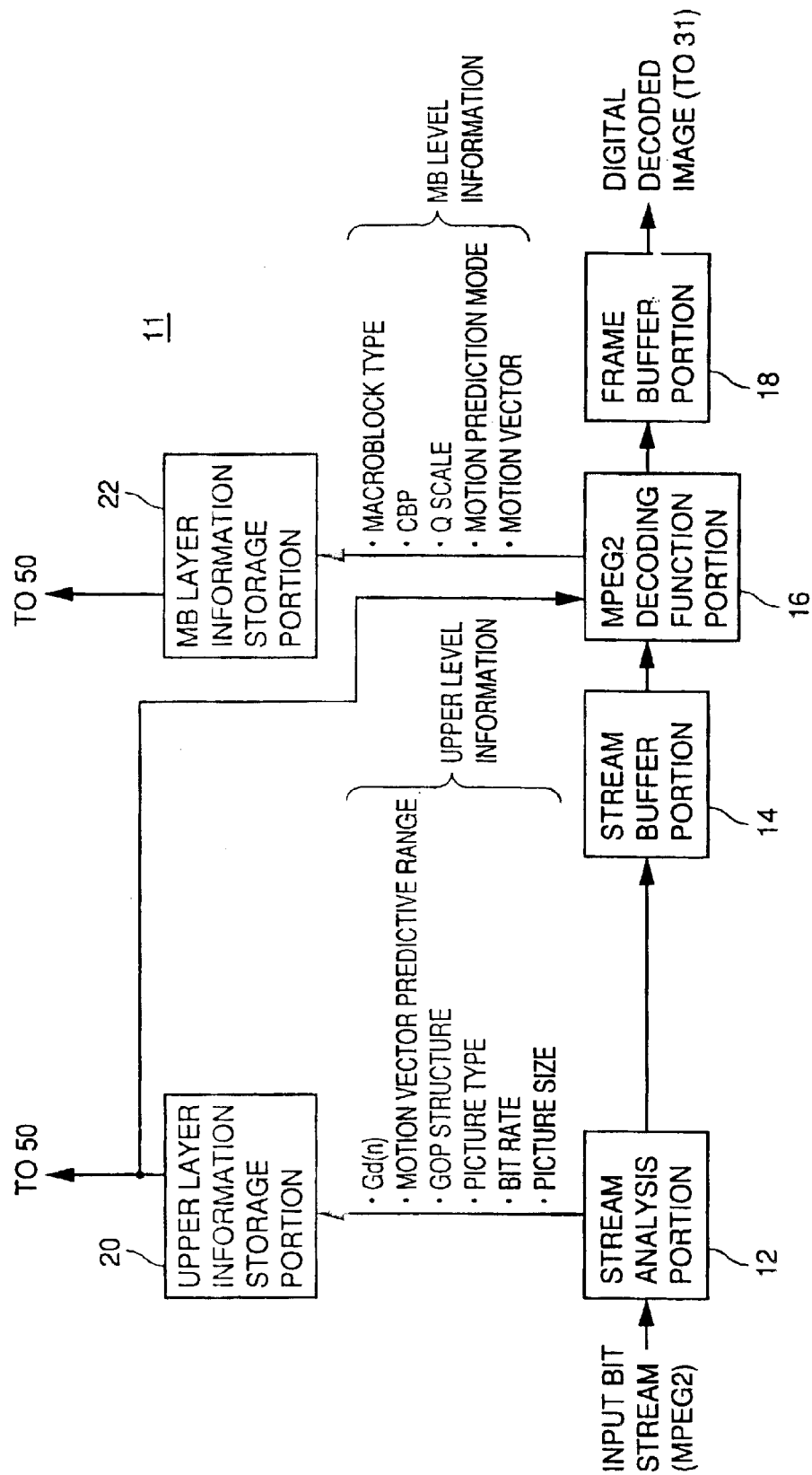
FIG. 2 is a block diagram illustrating the structure of an MPEG2 decoder portion 11.

Referring to FIG. 2, the MPEG2 decoder portion 11 includes a stream analysis portion 12 receiving the input bit stream, a stream buffer portion 14 for temporarily holding an output of the stream analysis portion 12, an MPEG2 decoding function portion 16 decoding the bit stream output from the stream buffer portion 14 by a constant quantity at a time and a frame buffer portion 18 for temporarily storing the decoded image obtained by the MPEG2 decoding function portion 16. The frame buffer portion 18 outputs the digital decoded image to the MPEG2 encoder portion 31.

The MPEG2 decoder portion 11 further includes an upper layer information storage portion 20 for storing information of upper layers extracted in the stream analysis portion 12 and an MB layer information storage portion 22 for storing information of a macroblock layer level obtained by the MPEG2 decoding function portion 16 in MPEG2 decoding processing.

The bit stream of an image signal according to the MPEG2 standard has a hierarchical structure formed by the following layers:

sequence layer (including sequence level header information)

GOP (group of picture) layer (including GOP level header information)

picture layer (including picture level header information)

slice layer (including slice level header information)

macroblock (MB) layer (including macroblock level information)

block layer sequence encode code

A bit stream of arbitrary dynamic image data is formed by the aforementioned layers, each of which includes a portion referred to as a header portion. Each header portion has information related to the layer inserted as a code under a predetermined syntax.

The stream analysis portion 12 extracts information necessary for transcoding including the bit rate and the picture size of the input bit stream, the picture type which is picture level information indicating the type of the coding system of each picture and the GOP structure of each picture from the header portions of the sequence, GOP and picture layers (these layers are hereinafter also referred to as upper layers) of the bit stream having such a hierarchical structure.

Simultaneously with such extraction of the information related to the upper layers, the stream analysis portion 12 counts and obtains the code quantity of each picture for each picture layer level. In the following description, symbol Gd(n) represents the code quantity of an n-th (n: natural number) picture in the input bit stream.

The stream analysis portion 12 stores each obtained picture code quantity Gd(n) and the information related to the upper layers necessary for transcoding in the upper layer information storage portion 20. The information held in the upper layer information storage portion 20 is supplied to the control portion 50 and the MPEG2 decoding function portion 16.

The stream buffer portion 14 temporarily buffers the bit stream output from the stream analysis portion 12 and outputs the same by a prescribed quantity, set in correspondence to the throughput of the MPEG2 decoding function portion 16, at a time.

The MPEG decoding function portion 16 decodes the bit stream output from the stream buffer portion 14 by the prescribed quantity at a time with the information related to the upper layers extracted in the stream analysis portion 12 and outputs the decoded image.

The frame buffer portion 18 temporarily holds the decoded image output from the MPEG2 decoding function portion 16 and outputs the same to the MPEG2 encoder portion 31 as the digital decoded image.

The MPEG2 decoding function portion 16 extracts macroblock (MB) level information in the process of decoding. The macroblock level information is represented by quantization characteristic values (MQUANT), a macroblock type and information of motion vectors. The extracted macroblock level information is held in the MB layer information storage portion 22 and supplied to the control portion 50.

The control portion 50 holds the coding information related to the upper layers and the macroblock level information extracted through decoding of the input bit stream and uses the information for re-encoding.

Re-encoding by the MPEG encoder portion 31 based on the coding information supplied from the control portion 50 is now described.

The first embodiment is described with reference to a technique of minimizing image deterioration resulting from re-encoding when the bit rate of the input bit stream is equivalent to or higher than a target bit rate in re-encoding. This technique is applicable for re-encoding an input bit stream of 6 Mbps at a bit rate of 3 Mbps, for example.

Figure 3:
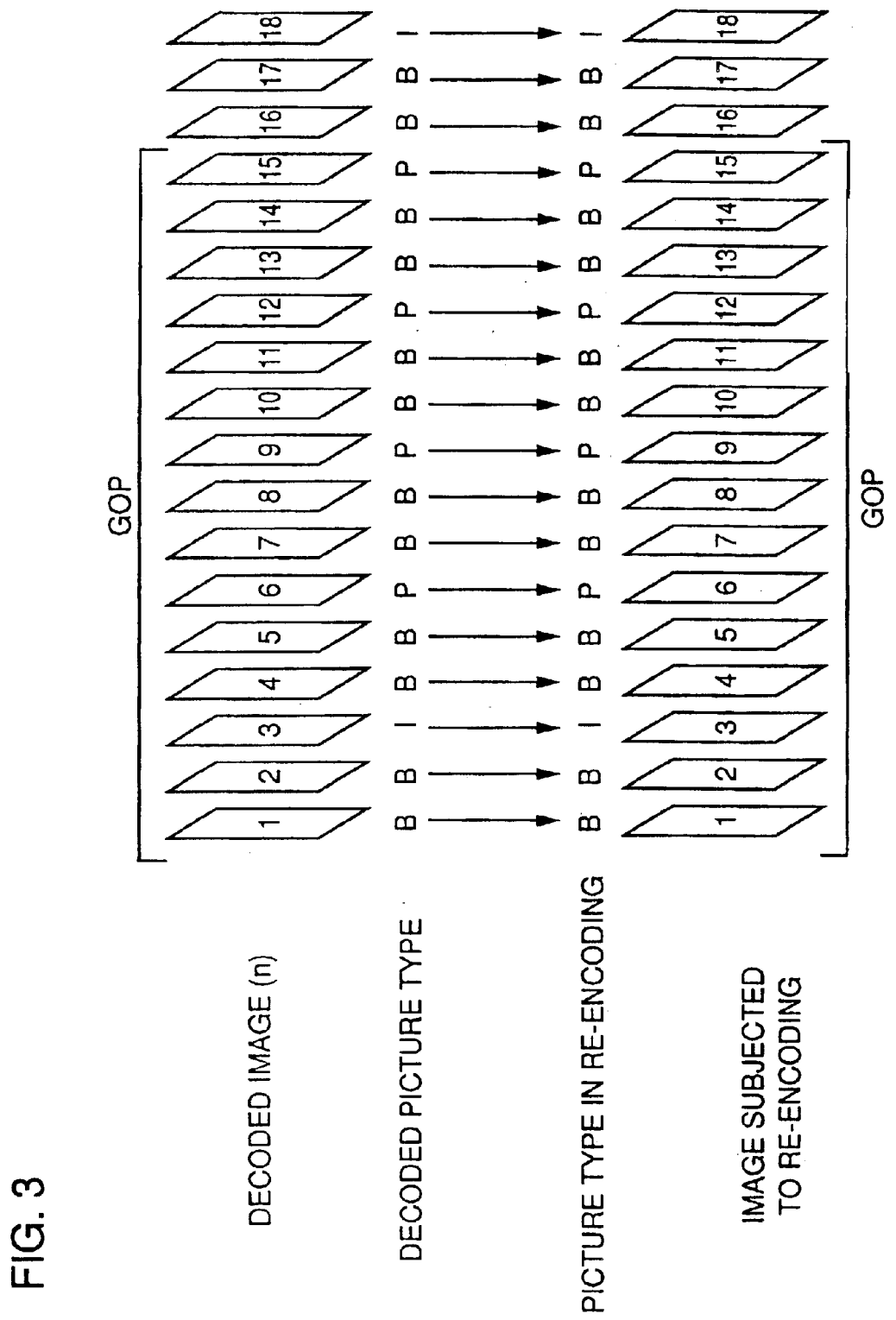
FIG. 3 illustrates re-encoding by an MPEG2 encoder portion 31 with reference to picture types.

FIG. 3 illustrates re-encoding by the MPEG2 encoder portion 31 with reference to the picture types (picture coding types).

In the MPEG2 standard, three coding types for an I picture (intra-coded picture), a P picture (predictive-coded picture) and a B picture (bidirectionally predictive-coded picture) are present as the types of pictures. The picture type is information indicating with which one of the I, P and B pictures each picture is coded.

The I picture, which is coded with closed information in only the single picture, can be decoded with only the information of the I picture itself.

As to the P picture for which a temporally preceding decoded I or P picture is used as a predictive picture (picture employed as the reference for computing difference), whether to code the difference between the same and a motion-compensated predictive picture or to code the I picture without computing the difference can be selected in macroblock units in response to the efficiency.

For the B picture, three types of pictures, i.e., a temporally preceding decoded I or P picture, a temporally subsequent decoded I or P picture and an interpolation picture formed by these pictures are used. The most efficient method is selected from coding of difference of these three types of pictures after motion compensation and intra coding in macroblock units.

Referring to FIG. 3, image signal data under the MPEG2 standard has a GOP formed by one or a plurality of I pictures and zero or a plurality of non-I pictures. In the example shown in FIG. 3, the GOP is formed by 15 pictures (n=1 to 15) and the cycle of the I or P pictures is 3.

The MPEG2 encoder portion 31 decides the coding parameter in re-encoding under the MPEG2 standard on the basis of the picture types extracted by the stream analysis portion 12 and supplied to the control portion 50 through the upper layer information storage portion 20.

More specifically, the MPEG2 encoder portion 31 matches the picture types in re-encoding with the corresponding pictures included in the input bit stream.

In other words, the decoded image decoded by the MPEG2 decoding function portion 16 is decoded on the basis of the picture types previously described on the bit stream as the picture level information. Further, re-encoding is executed while holding the same relation between the image subjected to re-coding and the picture types thereof as between the original decoded image and the decoded picture types. In other words, pictures decoded with I, P and B pictures in decoding in the MPEG2 decoding function portion 16 are re-encoded with the I, P and B pictures respectively. Thus, deterioration of the picture quality resulting from transcoding can be suppressed when transforming the input bit stream according to the MPEG2 standard to a lower bit rate.

Bit rate control in re-encoding is now described.

Figure 4:
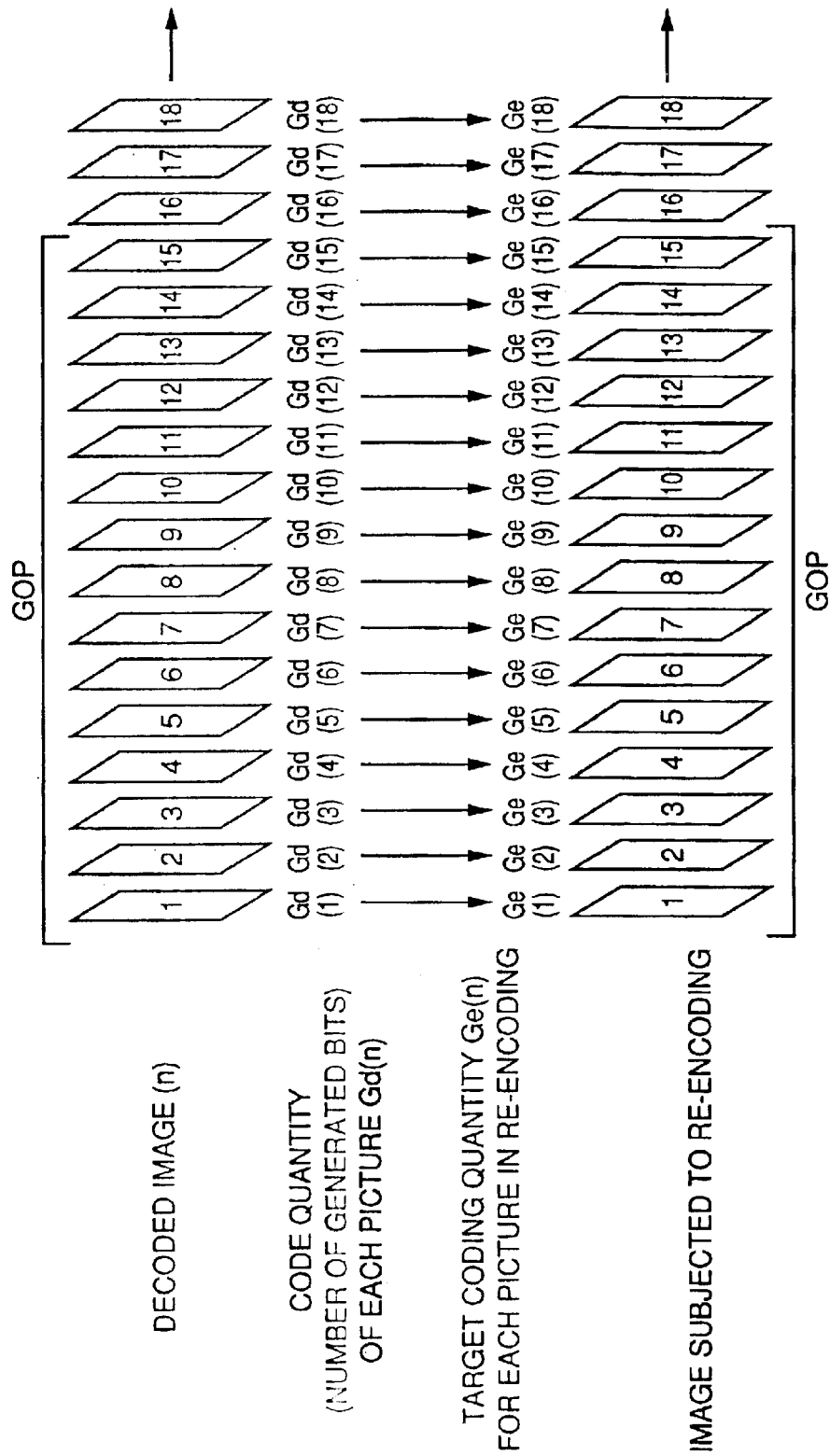
FIG. 4 illustrates bit rate control in the re-encoding by the MPEG2 encoder portion 31.

Referring to FIG. 4, the code quantity Gd(n) of each picture corresponding to an n-th (n: natural number) decoded image is counted by the stream analysis portion 12 and held in the upper layer information portion 20.

The MPEG2 encoder portion 31 sets a coding quantity in re-coding in correspondence to the counted code quantity Gd(n) of each picture on the input bit stream thereby executing assignment of the code quantity. When the bit rate of the input bit stream is 6 Mbps and a target bit rate in re-encoding is 3 Mbps, for example, the target coding quantity for each picture is ½. Assuming that Ge(n) represents the target coding quantity for each picture in re-coding, the relation between the same and the counted code quantity Gd(n) of the decoded image obtained from the input bit stream can be expressed as follows:

$$Ge(n)=f(k) \cdot Gd(n) \quad (1)$$

In this expression, k is expressed as BR(d)/BR(e), where BR(d) represents the bit rate of the input bit stream, BR(e) represents the target bit rate in re-encoding, and f(k) represents a prescribed function whose value is decided by the bit rate ratio k. The expression (1) indicates that the target coding quantity for each picture in re-encoding is set in response to the bit rate ratio k.

In place of the above expression (1), the following computational expression (2) employing not the simple function f(k) of the bit rate ratio k but a function f(BR(e), BR(d)) by the bit rates is also applicable:

$$Ge(n)=f(BR(e), BR(d)) \cdot Gd(n) \quad (2)$$

Further, it is also possible to decide the target coding quantity for each picture in re-encoding with reflection of the picture types extracted by the stream analysis portion 12. In other words, the target coding quantity in re-encoding is set under the relation proportionate to the counted code quantity of each picture corresponding to the decoded image in consideration of the picture types.

In other words, the target coding quantity G(n) for each picture in re-encoding is fragmented into GeI(n), GeP(n) and GeB(n) with reference to the picture types. Assuming that GdI(n), GdP(n) and GdB(n) represent counted code quantities of the respective picture types in the decoded image, the relation therebetween is expressed as follows:

$$GeI(n)=\alpha \cdot f(k) \cdot GdI(n) \quad (3)$$

$$GeP(n)=\beta \cdot f(k) \cdot GdP(n) \quad (4)$$

$$GeB(n)=\gamma \cdot f(k) \cdot GdB(n) \quad (5)$$

where f(k) represents a function set in response to the bit rate ratio k similarly to the expression (1), and $\alpha$, $\beta$ and $\gamma$ represent weighting factors provided for the respective picture types, which can be set for the respective pictures independently of each other.

Thus, a larger code quantity can be assigned to a specific picture type for selectively re-encoding the same, thereby further effectively suppressing deterioration of the picture quality resulting from transcoding.

In place of the above expressions (3), (4) and (5), the following computational expressions (6), (7) and (8) employing not the simple function f(k) of the bit rate ratio k but the respective bit rates and the functions by the weighting factors are also applicable:

$$GeI(n)=(\alpha, BR(e), BR(d)) \cdot GdI(n) \quad (6)$$

$$GeP(n)=(\beta, BR(e), BR(d)) \cdot GdP(n) \quad (7)$$

$$GeB(n)=(\gamma, BR(e), BR(d)) \cdot GdB(n) \quad (8)$$

Further, deterioration of the picture quality after re-encoding can be further suppressed by applying the GOP structure of the decoded image based on the input bit stream as such in re-encoding.

Figure 5:
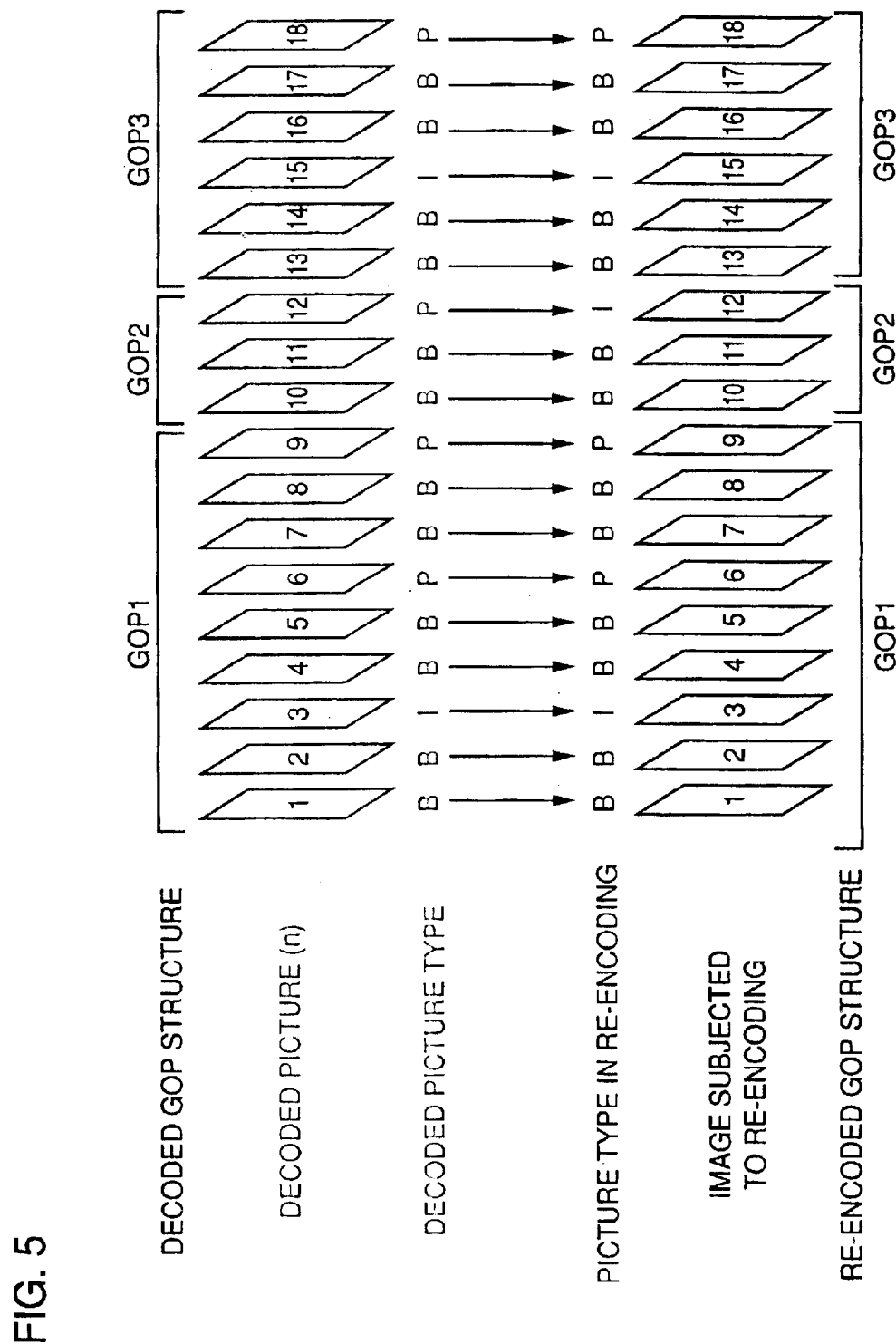
FIG. 5 illustrates re-encoding reflecting GOP structures of a decoded image.

FIG. 5 illustrates re-encoding reflecting the GOP structures of decoded pictures.

Referring to FIG. 5, decoded pictures of n=1 to 9 form a GOP 1, decoded pictures of n=10 to 12 form a GOP 2, and decoded pictures of n=13 to 18 form a GOP 3. The MPEG2 encoder portion 31 inherits the GOPs formed by the decoded pictures as such in re-encoding, for forming a re-encoded GOP 1 by the first to ninth pictures, a re-encoded GOP 2 by the tenth to twelfth pictures and a re-encoded GOP 3 by the thirteenth to eighteenth pictures.

In other words, the MPEG2 encoder portion 31 maintains the GOP structures formed by the decoded pictures as the minimum units of the sequence in re-encoding. Deterioration of the picture quality following transcoding can be further suppressed by matching the picture types and setting the target coding quantity based on the expression (1) or the expressions (2) to (8) in re-coding in the same GOP, as described above. It is also possible to improve flexibility by newly independently redistributing the picture types, the target coding quantity etc. in re-encoding in the same GOP.

As to the remaining upper layer information extracted by the bit stream analysis portion 12 in the MPEG2 decoder portion 11, it is also conceivable to decide the coding parameter in re-encoding in the MPEG2 encoder portion 31 with a motion vector predictive range (FCode[0/1][1/0]) which is the picture level information, for example. In other words, the motion vector predictive range in re-encoding is matched with the motion vector predictive range on each picture included in the input bit stream for each picture.

In other words, deterioration of the picture quality in re-encoding can be suppressed by executing motion prediction in a similar range on a picture for which a motion decoding range is specified with FCode data in decoding for re-encoding the same thereby suppressing useless motion prediction in re-encoding.

Description is now made on re-encoding based on the information of the slice level and the macroblock level obtained in the MPEG2 decoding function portion 16 in the MPEG2 decoder portion 11.

The macroblock level information conceivably includes the following information:

macroblock type

CBP (coded block pattern)

motion prediction mode and motion vectors

Q scale (quantization characteristic value)

activity

The macroblock type, indicating the type of a transferred macroblock, has information as to whether prediction performed in the macroblock is intra-frame prediction or inter-frame prediction, whether or not motion compensation is performed, whether an in-loop filter is on or off, whether or not the quantization step size is changed, and the like.

CBP, also referred to as a significant block pattern, indicates whether or not blocks included in the macroblock are significant blocks (coded blocks). The term "significant block" generally indicates a block exhibiting change from the same position on a preceding picture and transferring at least one transformation factor.

The motion prediction mode, which is information indicating a method of predicting the motion vector, includes field prediction, frame prediction or the like depending on the method of prediction. The motion vectors, expressed in horizontal and vertical components, are subjected to coding of the difference between the same and motion vectors of a preceding macroblock.

The Q scale indicates the step size of quantization in execution of digital processing.

Statistical processing is executed on these data extracted or operated for each macroblock in arbitrary units, i.e., picture units or slice units for obtaining mean values, distribution values, maximum values or minimum values and using these statistical values for re-encoding. For example, a mean Q scale of each slice unit in the decoded image is conceivably applied as a parameter of a Q scale computational expression for an object slice of an image subjected to re-encoding.

Further, a motion prediction mode and motion vector information of a group of continuous macroblocks of arbitrary units can be extracted for applying any of the following modes to the group of macroblocks subjected to re-encoding:

A mode of applying a motion prediction mode for a group of decoded macroblocks to macroblocks subjected to re-encoding.

A mode of executing a motion search only in the range of motion vectors of a group of decoded macroblocks in macroblocks subjected to re-encoding.

A mode of executing a motion search in an arbitrary range with reference to positions of motion vectors of a group of decoded macroblocks.

Such application of the motion prediction mode can be executed not only over a group of macroblocks but for each single macroblock.

Thus, deterioration of the picture quality in re-encoding can be suppressed by performing re-encoding on the basis of information obtained at the slice level and the macroblock level.

Second Embodiment

A second embodiment of the present invention is described with reference to a structure of suppressing image deterioration when the bit rate of an input bit stream is equivalent to or lower than a target bit rate in re-encoding. This structure is applicable when transcoding an input bit stream of 6 Mbps at a target bit rate of 3 Mbps, for example.

When the bit rate of an input bit stream is lower than or equivalent to a target bit rate in re-encoding, the image signal transcoder according to the second embodiment of the present invention does not decodes but utilizes the input bit stream as an output bit stream as such.

Figure 6:
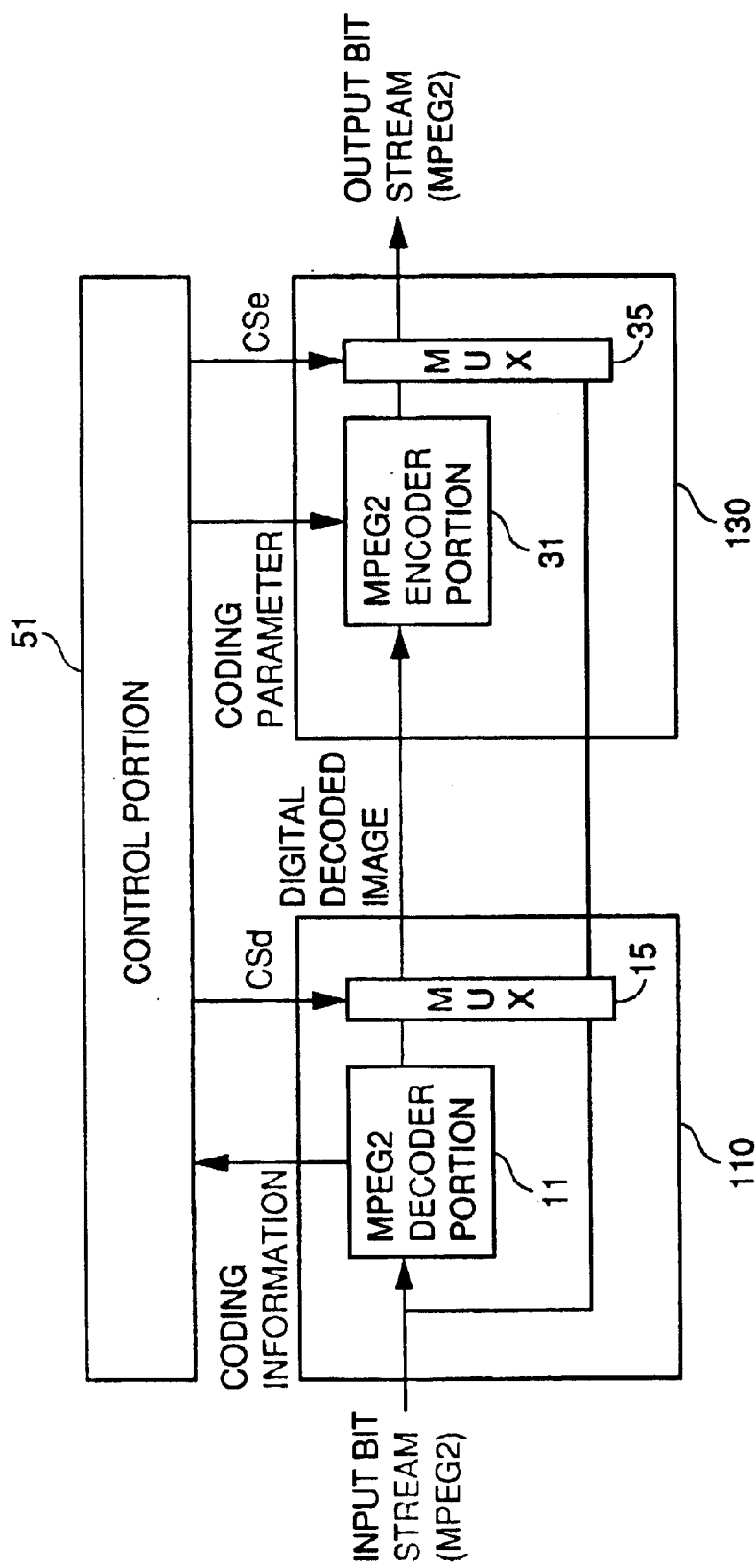
FIG. 6 is a schematic block diagram showing the structure of an image signal transcoder 101 according to a second embodiment of the present invention.

Referring to FIG. 6, the image signal transcoder 101 according to the second embodiment of the present invention comprises an MPEG2 decoding block 110, an MPEG2 coding block 130 and a control portion 51 in place of the MPEG2 decoding block 110, the MPEG2 coding block 130 and the control portion 50 of the image signal transcoder 100 shown in FIG. 1 respectively.

The MPEG2 decoding block 110 further includes a multiplexer 15 on a rear stage of an MPEG2 decoder portion 11, and the MPEG2 coding block 130 further includes a multiplexer 35 on a rear stage of an MPEG2 encoder portion 31.

If the bit rate of the input bit stream is equal to the target bit rate in re-encoding, the multiplexer 15 outputs the input bit stream bypassed through the MPEG2 decoder portion 11 to the multiplexer 35 as such in response to a control signal CSd output from the control portion 51. The multiplexer 35 outputs not an output from the MPEG2 encoder portion 31 but the input stream output from the multiplexer 15 as such as an output bit stream in response to a control signal CSe similarly output from the control portion 51.

Considering the case that the bit rate of the input bit stream is less than the target bit rate, the bit rate of the input bit stream is hard to be enhanced using the MPEG2 decoder portion 11 and the MPEG2 encoder portion 31 in this embodiment. If the bit rate of the input bit stream is less than the target bit rate, therefore, the multiplexers 15 and 35 select and output the input bit stream as such in response to the control signals CSd and CSe, respectively, and it is not necessary to operate the MPEG2 decoder portion 11 and the MPEG2 encoder portion 31. The bit rate of the output bit stream output from the MPEG2 coding block 130 is not more than bus the same as the bit rate of the input bit stream.

If the bit rate of the input bit rate is higher than the target bit rate in re-encoding, the multiplexer 15 outputs a digital decoded image output from the MEPG2 decoder portion 11 to the multiplexer 35 in response to the control signal CSd output from the control portion 51. The multiplexer 35 outputs coded data re-encoded by the MPEG2 encoder portion 31 as the output bit stream in response to the control signal CSe similarly output from the control portion 51. Operations of the MPEG2 decoder portion 11 and the MPEG2 encoder portion 31 in this case are identical to those described with reference to the first embodiment, and hence redundant description is not repeated.

The control portion 51 controls the levels of the control signals CSd and CSe in response to the relation between the target bit rate after re-encoding and the bit rate of the input bit stream thereby switching the outputs of the multiplexers 15 and 35.

Thus, data processing can be readily performed when the target bit rate after re-encoding is not more than the bit rate of the input bit stream by arranging the multiplexers 15 and 35 and adding paths for bypassing decoding by the MPEG2 decoder portion 11 and re-encoding by the MPEG2 encoder portion 31. In this case, re-encoding can be effectively omitted by comparing the bit rates not in picture units but in minimum GOP units.

The image signal transcoder 101 can also switch the outputs of the multiplexers 15 and 35 for temporarily decoding the input bit stream, thereafter re-encoding the bit stream and outputting the same through the MPEG2 decoder portion 11 and the MPEG2 encoder portion 31. In other words, the image signal transcoder 101 can efficiently perform transcoding between bit streams having different bit rates under the MPEG2 standard by switching the control signals CSd and CSe by the control portion 51 in response to the relation between the bit rate of the input bit stream and the target bit rate in re-encoding.

Third Embodiment

A third embodiment of the present invention is described with reference to a structure having a postprocessing function and a preprocessing function provided for matching a digital decoded image intermediately obtained by decoding an input bit stream with a standard format.

Figure 7:
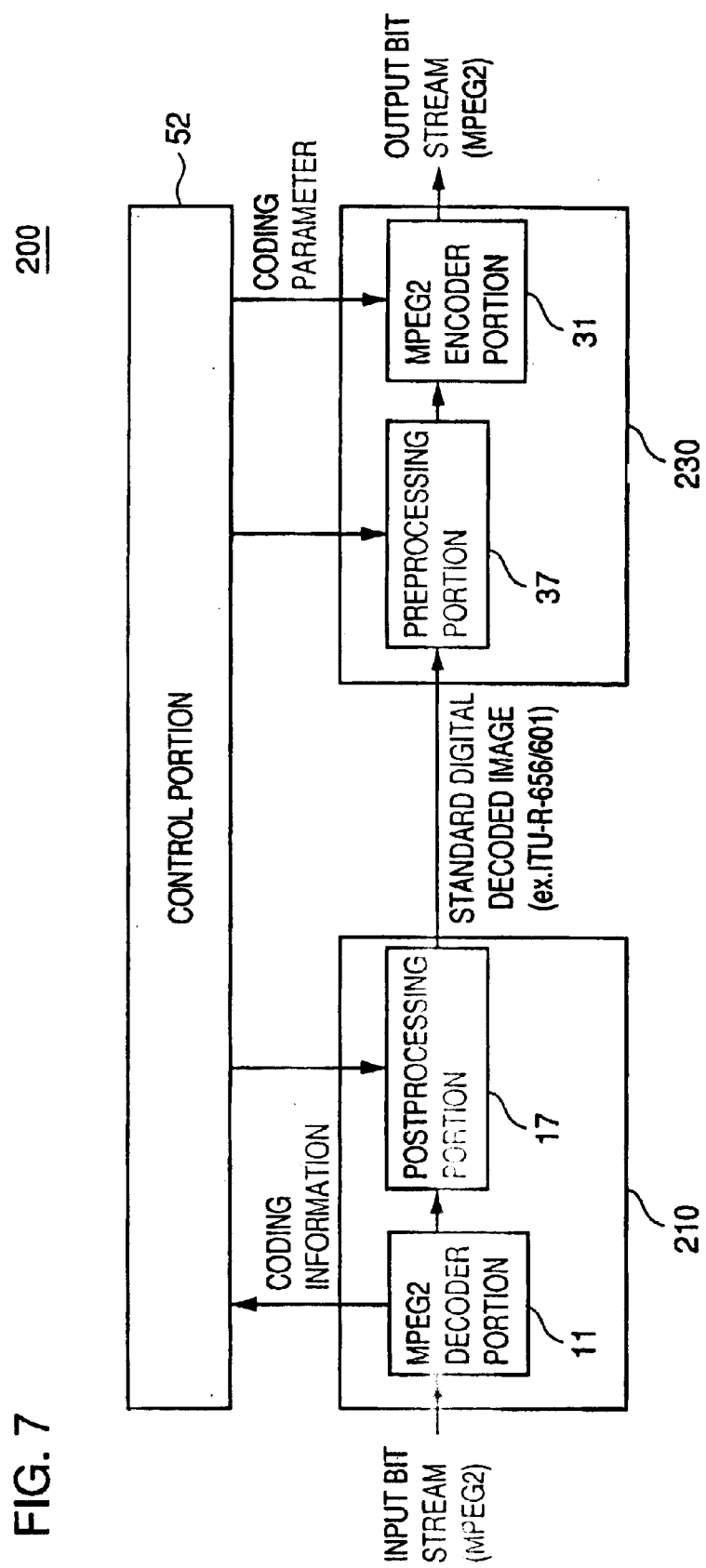
FIG. 7 is a schematic block diagram showing the overall structure of an image signal transcoder 200 according to a third embodiment of the present invention.

Referring to FIG. 7, the image signal transcoder 200 according to the third embodiment of the present invention comprises an MPEG2 decoding block 210 and an MPEG coding block 230 in place of the MPEG2 decoding block 10 and the MPEG2 coding block 30 of the image signal transcoder 100 shown in FIG. 1 respectively.

The MPEG2 decoding block 210 further includes a postprocessing portion 17 for matching a decoded image output from an MPEG2 decoder portion 11 with a standard format ITU-R-601 or ITU-R-656, in addition to the MPEG2 decoder portion 11. The postprocessing portion 17 performs processing such as temporal filtering, spatial filtering and resolution transformation on the digital decoded image decoded by the MPEG2 decoder portion 11.

The MPEG2 coding block 230 includes a preprocessing portion 37 executing processing prepared for coding on the standard digital decoded image output from the postprocessing portion 17. An MPEG2 encoder portion 31 executes re-encoding under the MPEG2 standard on the preprocessed digital decoded image output from the preprocessing portion 37.

The preprocessing portion 37 performs processing such as temporal filtering, spatial filtering and resolution transformation on the input standard digital decoded image in preparation for coding.

The image signal transcoder 210 performs effective control on the postprocessing portion 17 and the preprocessing portion 37 with upper layer information or macroblock layer information extracted in decoding, thereby suppressing image deterioration following decoding/re-encoding and improving the picture quality.

For example, transcoding with resolution transformation is described. A digital image subjected to coding is generally transformed to any of the following picture sizes:

720 (704) pixels×480 lines (FullD1)
360 (352) pixels×480 lines (HalfD1)
544 pixels×480 lines (¾D1)
480 pixels×480 lines (⅔D1)
360 pixels×240 lines (SIF)

The picture sizes excluding FullD1 are employed for reducing the number of pixels subjected to coding and equivalently increasing the bit rate for improving the picture quality mainly when performing coding at a low bit rate.

Referring to FIG. 7, the preprocessing portion 37 has functions for horizontal/vertical spatial filtering, temporal filtering and resolution transformation, which are adaptively controlled with parameter information of upper layer and macroblock layer levels supplied from a control portion 50.

When the image decoded by the MPEG2 decoder portion 11 has the picture size FullD1, the preprocessing portion 37 transforms the image to the resolution of the picture size HalfD1 or ¾D1 smaller than the picture size FullD1 for executing coding. In this case, deterioration of the picture quality can be suppressed also when executing transcoding at a low bit rate by combining the concepts of matching the picture types, setting the target bit rate in re-encoding etc. described with reference to the first embodiment.

The postprocessing portion 17 can also control the picture quality by receiving parameters of the upper layer information and the macroblock layer information obtained in the process of decoding in the MPEG2 decoder portion 11.

As to resolution transformation, the postprocessing portion 17 has a function of inversely transforming an image previously transformed to the picture size SIF, ⅔D1, ¾D1 or HalfD1 for forming a bit stream to the picture size FullD1, while this function is basically not used for general transcoding.

Figure 8:
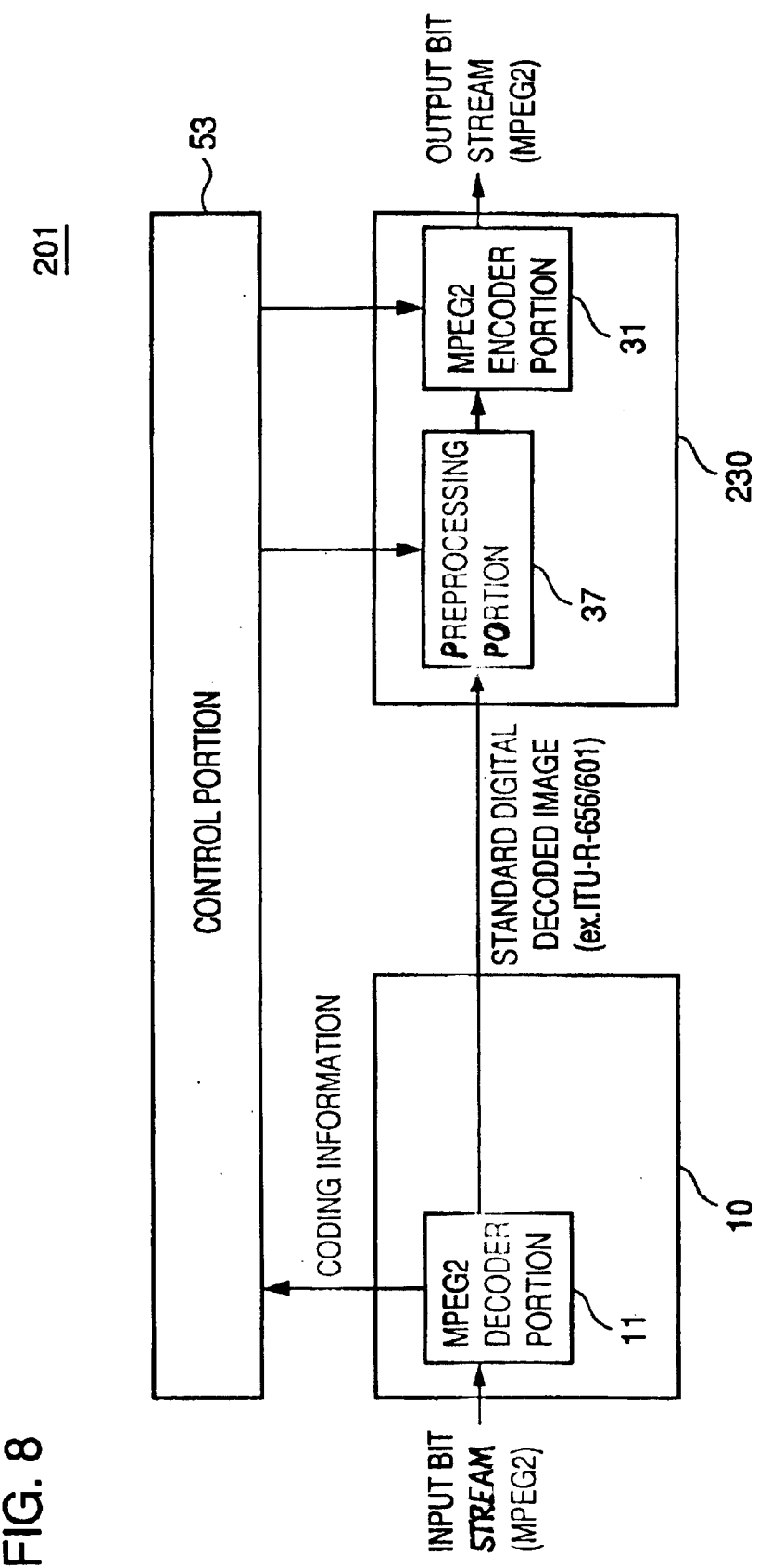
FIG. 8 is a schematic block diagram showing the overall structure of another image signal transcoder 201 according to the third embodiment of the present invention.

Referring to FIG. 8, an another image signal transcoder 201 according to the third embodiment of the present invention is different from the image signal transcoder 200 shown in FIG. 7 in a point that the transcoder 201 has no postprocessing portion 17. The structures and operations of the remaining portions are similar to those described with reference to FIG. 7, and hence redundant description is not repeated.

The structure of the image signal transcoder 201 is applicable when an MPEG2 decoder portion 11 directly obtains a digital decoded image according to a standard format, for attaining an effect similar to that of the image signal transcoder 200.

Figure 9:
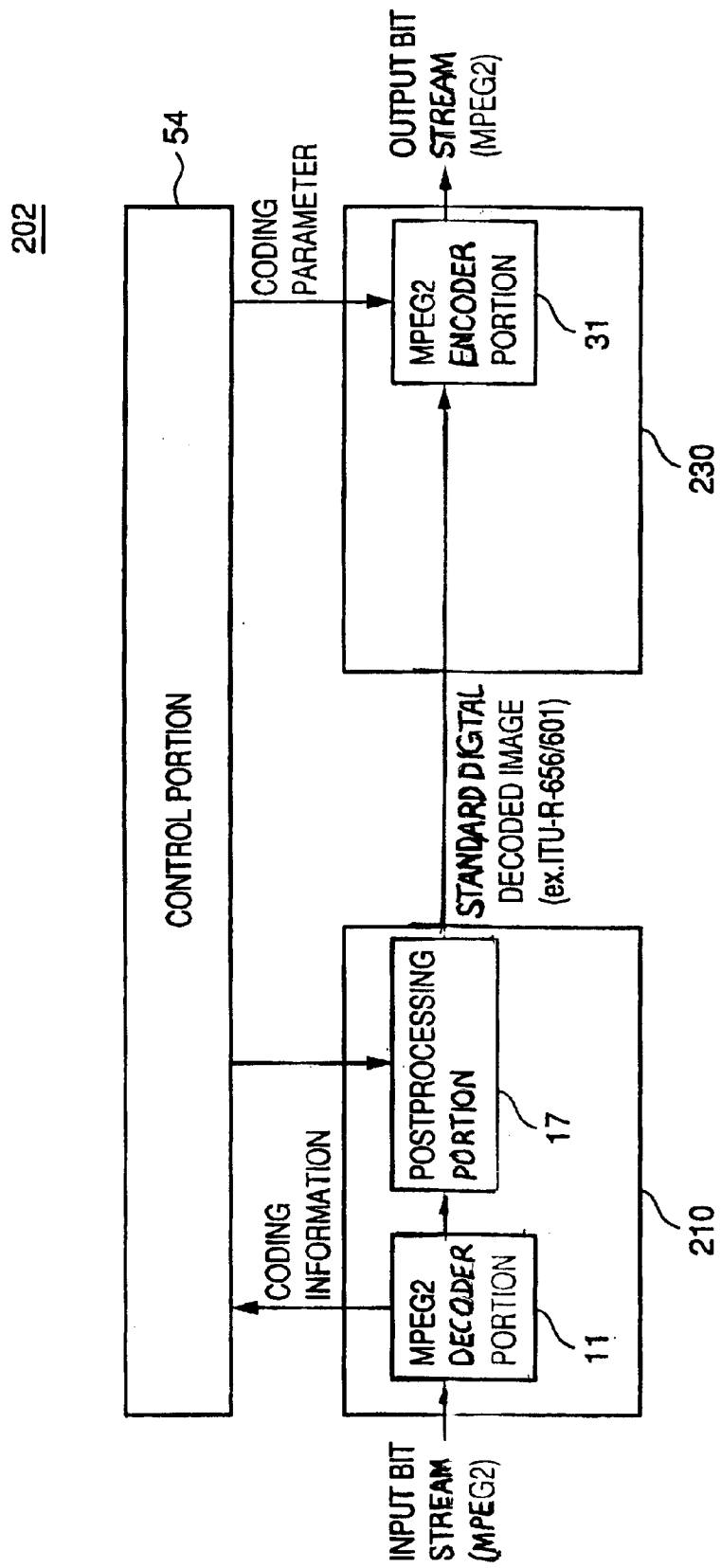
FIG. 9 is a schematic block diagram showing the overall structure of still another image signal transcoder 202 according to the third embodiment of the present invention.

Referring to FIG. 9, a still another image signal transcoder 202 according to the third embodiment of the present invention is different from the image signal transcoder 200 shown in FIG. 7 in a point that the transcoder 202 has no preprocessing portion 37. The structures and operations of the remaining portions are similar to those described with reference to FIG. 7, and hence redundant description is not repeated.

The structure of the image signal transcoder 202 is applicable when an MPEG2 encoder portion 31 can directly code a digital decoded image according to the standard format, for attaining an effect similar to that of the image signal transcoder 200.

Fourth Embodiment

A fourth embodiment of the present invention is described with reference to transcoding between different coding standards.

Figure 10:
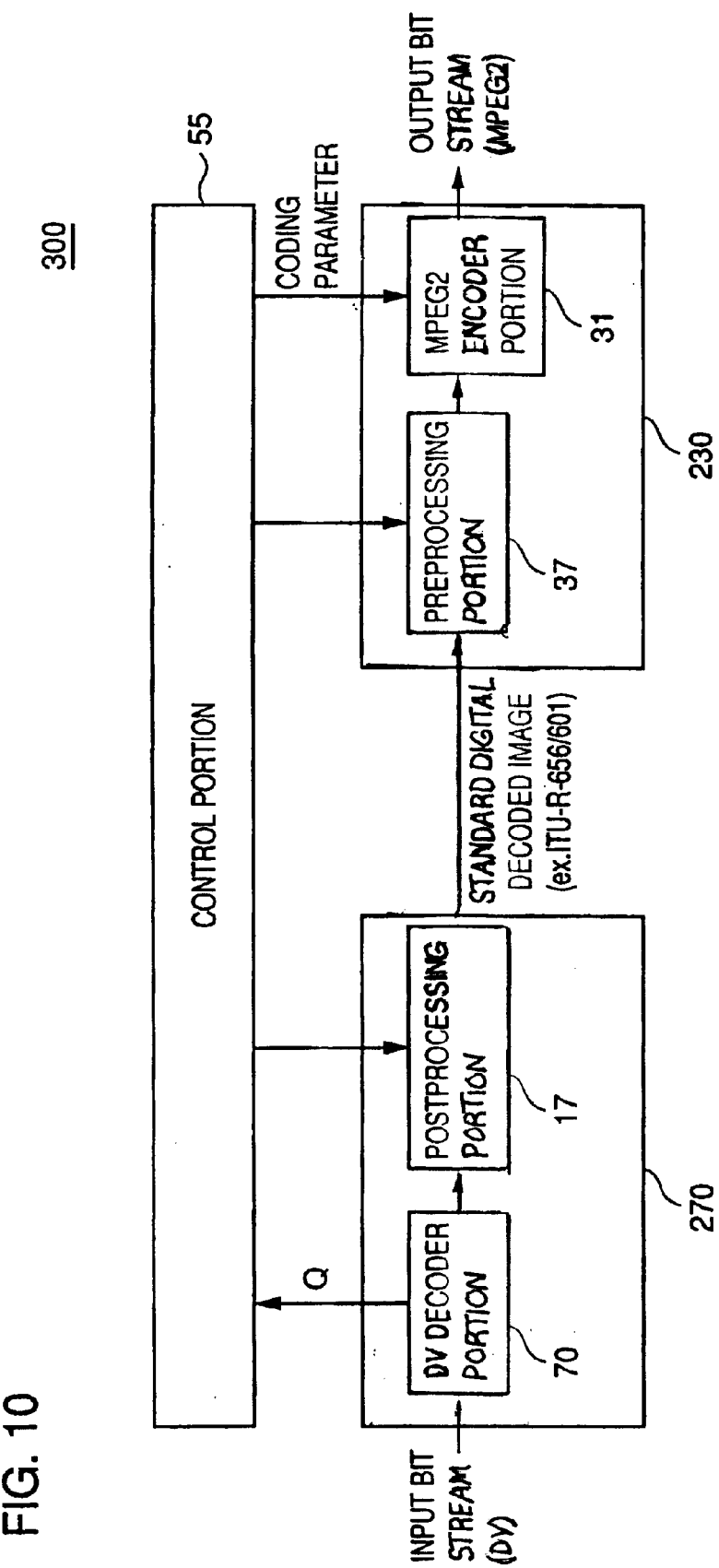
FIG. 10 is a schematic block diagram showing the structure of an image signal transcoder 300 according to a fourth embodiment of the present invention.

FIG. 10 is a schematic block diagram showing the structure of an image signal transcoder 300 according to the fourth embodiment of the present invention.

The image signal transcoder 300 executes transcoding between the DV standard and the MPEG2 standard.

Referring to FIG. 10, the image signal transcoder 300 comprises a DV decoding block 270 receiving an input bit stream coded under the DV standard and outputting a digital decoded image according to a standard format, an MPEG2 coding block 230 receiving the standard digital decoded image output from the DV decoding block 270 and re-encoding the same into an output bit stream according to the MPEG2 standard and a control portion 55 for controlling re-encoding etc. on the basis of coding information obtained when decoding the input bit stream.

The DV decoding block 270 includes a DV decoder portion 70 for decoding the input bit stream and obtaining the digital decoded image and a postprocessing portion 17 transforming the decoded image data output from the DV decoder portion 70 to the standard format by performing processing such as temporal filtering, spatial filtering and resolution transformation.

Figure 11:
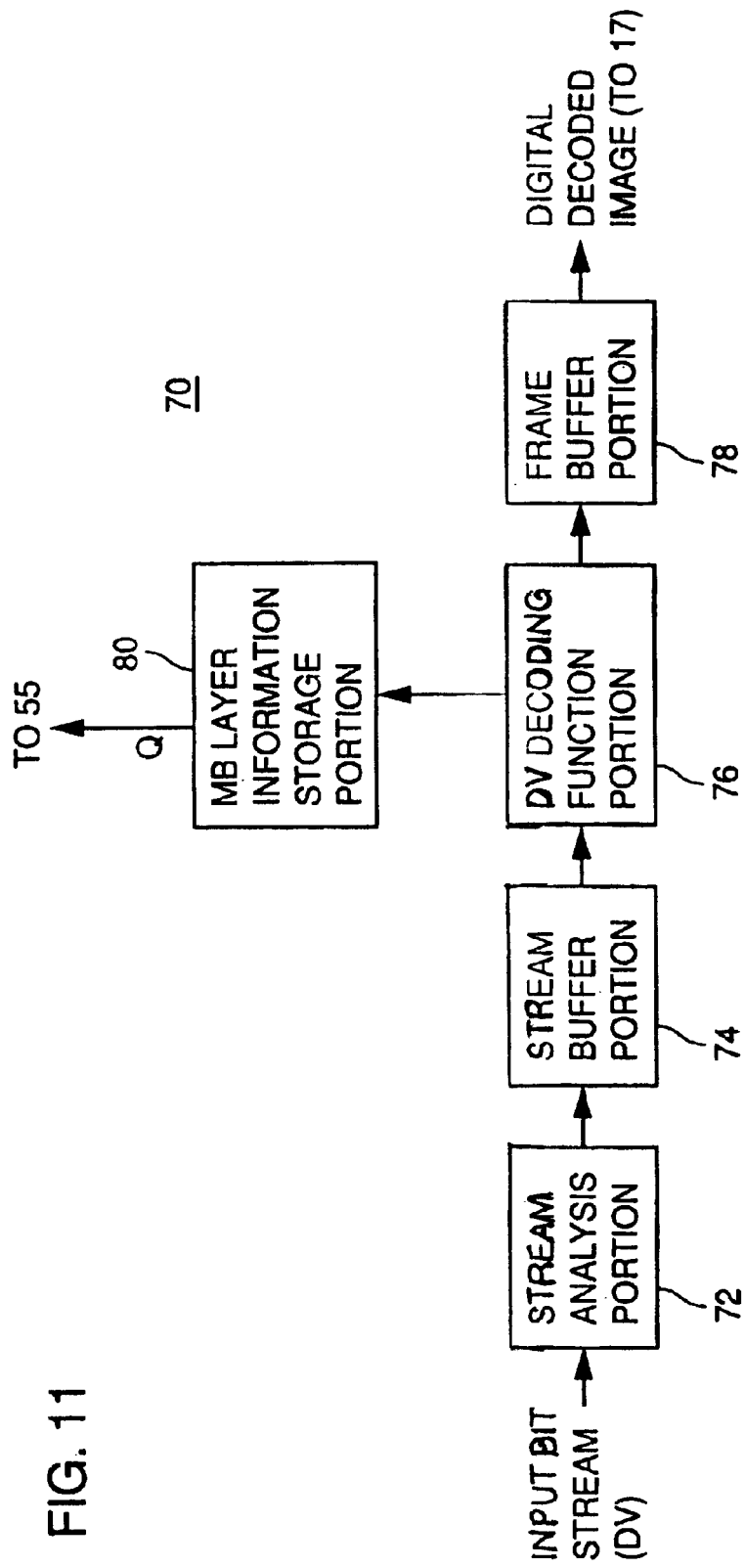
FIG. 11 is a block diagram showing the structure of a DV decoder portion 70.

Referring to FIG. 11, the DV decoder portion 70 includes a stream analysis portion 72 receiving, the input bit stream, a stream buffer portion 74 for temporarily holding an output of the stream analysis portion 72, a DV decoding function portion 76 decoding the bit stream output from the stream buffer portion 74 by a constant quantity at a time and a frame buffer portion 78 for temporarily storing the decoded image obtained by the DV decoding function portion 76. The frame buffer portion 78 outputs the digital decoded image to the postprocessing portion 17, which in turn transforms the digital decoded image to the standard format.

The DV decoder portion 70 further includes an MB layer information storage portion 80 for storing information of a macroblock layer level obtained by the DV decoding function portion 76 in DV decoding.

While in the image signal transcoder 300 a parameter in re-encoding is also set by control portion 55 on the basis of coding information obtained in DV decoding, the DV standard is a fixed length coding system with a single picture type (corresponding to the I frame of the MPEG2 system) and hence it is effective to extract a quantization value Q for each macroblock or a unit, referred to as a superblock, formed by a plurality of adjacent macroblocks specific to the DV standard and employ the value Q for calculating the coding parameter in re-encoding. Therefore, the MB layer information storage portion 80 holds the quantization value Q for each macroblock or each superblock and supplies the same to the control portion 55.

Referring again to FIG. 10, the MPEG2 coding block 230 includes a preprocessing portion 37 performing processing such as temporal filtering, spatial filtering and resolution transformation on the standard digital decoded image in preparation for re-encoding under the MPEG2 standard and an MPEG2 encoder portion 31 receiving an output of the preprocessing portion 37 and performing re-encoding under the MEPG2 standard.

The MPEG2 encoder portion 31 re-encodes the preprocessed digital image. The control portion 55 sets the coding parameter in re-encoding in the MPEG2 encoder portion 31 on the basis of the aforementioned quantization value Q for each macroblock or each superblock.

Figure 12:
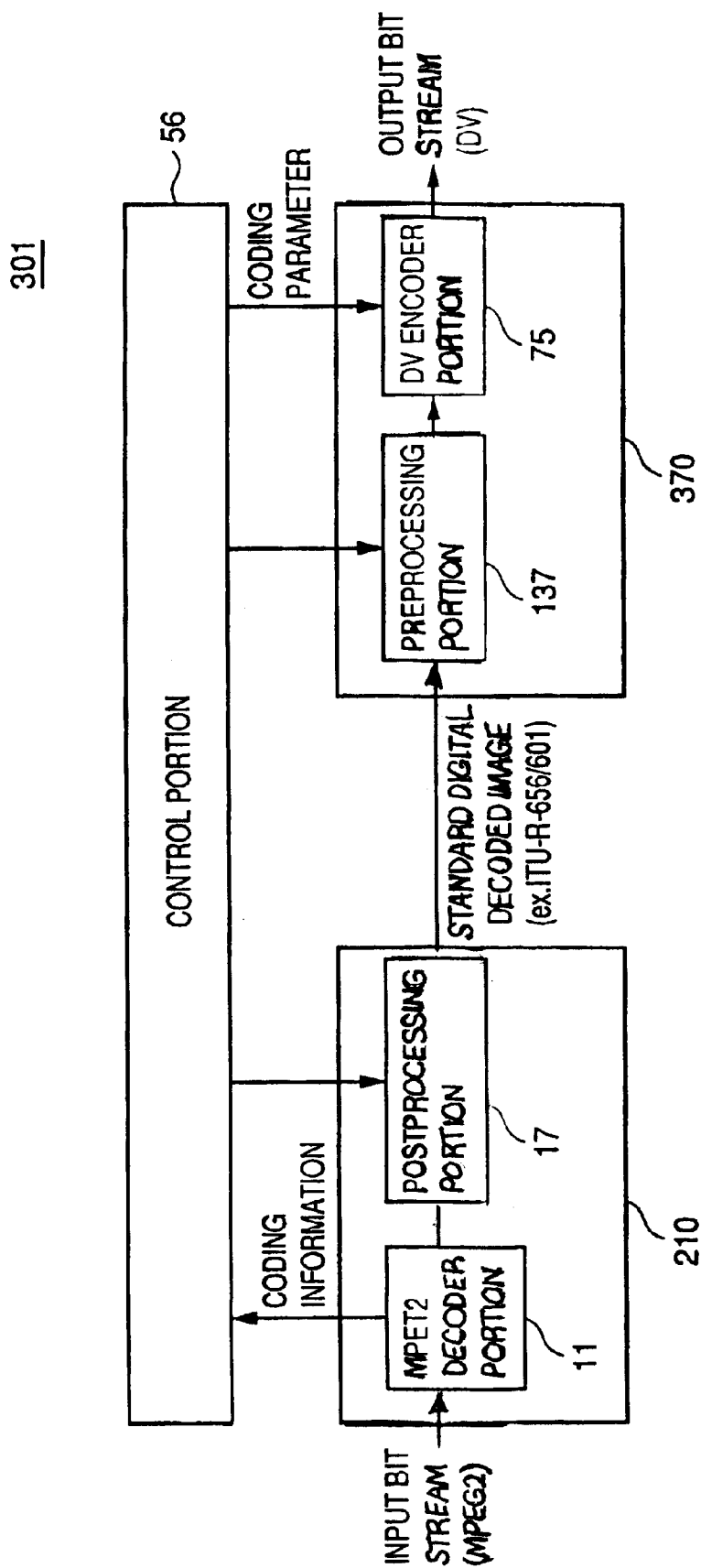
FIG. 12 is a schematic block diagram showing the structure of another image signal transcoder 301 according to the fourth embodiment of the present invention.

FIG. 12 is a schematic block diagram showing the structure of another image signal transcoder 301 according to the fourth embodiment.

The image signal transcoder 301 receives a bit stream according to the MPEG2 standard, transcodes the bit stream to an output bit stream according to the DV standard and outputs the same.

Referring to FIG. 12, the image signal transcoder 301 comprises an MPEG2 decoding block 210 receiving the input bit stream coded under the MPEG2 standard and outputting a digital decoded image according to a standard format, a DV coding block 370 receiving the standard digital decoded image output from the MPEG2 decoding block 210 and re-encoding the same into the output bit stream according to the DV standard, and a control portion 56 for controlling the re-encoding etc. on the basis of coding information obtained when decoding the input bit stream.

The structure and operations of the MPEG2 decoding block 210 are identical to those described with reference to FIG. 7, and hence redundant description is not repeated.

The DV coding block 370 includes a preprocessing portion 137 performing processing such as temporal filtering, spatial filtering and resolution transformation on the standard digital decoded image in preparation for re-encoding under the DV standard and a DV encoder portion 75 receiving an output of the preprocessing portion 137 and performing re-encoding under the DV standard.

The control portion 56 receives the coding information extracted in decoding in the MPEG2 decoder portion 11 and reflecting the coding information on postprocessing and preprocessing, while setting the coding parameter of the DV standard in re-encoding in the DV encoder portion 75 on the basis of the coding information of the MPEG2 standard.

The bit stream can be transcoded between the DV standard and the MPEG2 standard due to the aforementioned structure. The coding parameter in re-encoding is set on the basis of the information obtained in decoding, and hence image deterioration resulting from transcoding can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image signal transcoder temporarily decoding an input bit stream of coded image signal and re-coding said image signal under a prescribed system, comprising:
   a decoding processing portion decoding said input bit stream according to a prescribed coding standard and outputting decoded image data while extracting coding information of said input bit stream;
   a coding processing portion re-coding said decoded image data under said prescribed coding standard and forming an output bit stream; and
   a control portion setting a coding parameter in re-coding of said coding processing portion on the basis of said coding information; wherein
   said prescribed coding standard is the MPEG2 standard;
   said coding information includes information related to an upper layer and information of a macroblock level; and
   said decoding processing portion includes:
      a stream analysis portion receiving said input bit stream and extracting said information related to said upper layer,
      an MPEG2 decoding function portion decoding said input bit stream received through said stream analysis portion and outputting said decoded image data while extracting said information of said macroblock level,
      an upper layer information storage portion receiving said information related to said upper layer from said stream analysis portion and supplying said information to said MPEG2 decoding function portion and said control portion, and
      a macroblock level information storage portion receiving said information of said macroblock level from said MPEG2 decoding function portion and supplying said information to said control portion.

2. The image signal transcoder according to claim 1, wherein
   said information related to said upper layer includes information related to the picture type of each picture in said input bit stream.

3. The image signal transcoder according to claim 1, wherein
   said information related to said upper layer includes information related to the GOP structure of each picture in said input bit stream.

4. The image signal transcoder according to claim 1, wherein
   said information related to said upper layer includes information related to the motion vector predictive range of each picture in said input bit stream.

5. The image signal transcoder according to claim 1, wherein
   said information related to said upper layer includes information related to an actual code quantity of each picture in said input bit stream.

6. The image signal transcoder according to claim 5, wherein
   said control portion sets a target coding quantity in said re-coding of said each picture in response to said actual code quantity, the bit rate of said input bit stream and a target bit rate of said output bit stream.

7. The image signal transcoder according to claim 1, wherein
   said information of said macroblock level includes information related to the type of a macroblock, information related to a significant block pattern and information related to a motion prediction mode and a motion vector.

8. The image signal transcoder according to claim 1, wherein
   said information of said macroblock level includes a Q scale which is information related to a step size of quantization.

9. An image signal transcoder temporarily decoding an input bit stream of coded image signal and re-coding said image signal under a prescribed system, comprising:
   a decoding processing portion decoding said input bit stream according to a prescribed coding standard and outputting decoded image data while extracting coding information of said input bit stream;
   a coding processing portion re-coding said decoded image data under said prescribed coding standard and forming an output bit stream; and
   a control portion setting a coding parameter in re-coding of said coding processing portion on the basis of said coding information; wherein
   said prescribed coding standard is the MPEG2 standard,
   said decoding processing portion includes:
      an MPEG2 decoding processing portion receiving and decoding said input bit stream and outputting said decoded image data, and
      a first output switching circuit receiving said input bit stream and said decoded image data and outputting either said input bit stream or said decoded image data under control by said control portion,
   said coding processing portion includes:
      an MPEG2 coding processing portion re-coding said decoded image data received through said first output switching circuit, and
      a second output switching circuit receiving outputs of said MEPG2 coding processing portion and said first output switching circuit and outputting either output as said output bit stream under control by said control portion, and
   said control portion controls said outputs of said first and second output switching circuits in response to the relation between the bit rate of said input bit stream and a target bit rate of said output bit stream.

10. The image signal transcoder according to claim 9, wherein
    said control portion controls said first and second output switching circuits to output said input bit stream as said output bit stream as such when said target bit rate of said output bit stream is not less than the bit rate of said input bit stream.

11. An image signal transcoder temporarily decoding an input bit stream of coded image signal and re-coding said image signal under a prescribed system, comprising:
    a decoding processing portion decoding said input bit stream according to a prescribed coding standard and outputting decoded image data while extracting coding information of said input bit stream;
    a coding processing portion re-coding said decoded image data under said prescribed coding standard and forming an output bit stream; and a control portion setting a coding parameter in re-coding of said coding processing portion on the basis of said coding information; wherein
said prescribed coding standard is the MEPG2 standard,
said decoding processing portion includes:
an MPEG2 decoding processing portion decoding said input bit stream and outputting said decoded image data, and
a postprocessing portion transforming said decoded image data to a standard format, and
said control portion controls data transformation in said postprocessing portion on the basis of said coding information.

12. An image signal transcoder temporarily decoding an input bit stream of coded image signal and re-coding said image signal under a prescribed system, comprising:
a decoding processing portion decoding said input bit stream according to a prescribed coding standard and outputting decoded image data while extracting coding information of said input bit stream;
a coding processing portion re-coding said decoded image data under said prescribed coding standard and forming an output bit stream; and
a control portion setting a coding parameter in re-coding of said coding processing portion on the basis of said coding information; wherein
said prescribed coding standard is the MEPG2 standard,
said decoding processing portion outputs said decoded image data according to a standard format,
said coding processing portion includes:
a preprocessing portion receiving said decoded image data according to said standard format and performing transformation in preparation for said re-coding, and
an MPEG2 coding processing portion receiving said decoded image data from said preprocessing portion and executing said re-coding, and
said control portion controls data transformation in said preprocessing portion on the basis of said coding information.

13. An image signal transcoder temporarily decoding an input bit stream of coded image signal and re-coding said image signal under a prescribed system, comprising:
a decoding processing portion decoding said input bit stream according to a prescribed coding standard and outputting decoded image data while extracting coding information of said input bit stream;
a coding processing portion re-coding said decoded image data under said prescribed coding standard and forming an output bit stream; and
a control portion setting a coding parameter in re-coding of said coding processing portion on the basis of said coding information; wherein
said prescribed coding standard is the MPEG2 standard,
said decoding processing portion includes:
an MPEG2 decoding processing portion decoding said input bit stream and outputting said decoded image data, and
a postprocessing portion transforming said decoded image data to a standard format,
said coding processing portion includes:
a preprocessing portion receiving said decoded image data according to said standard format and performing transformation in preparation for said re-coding, and
an MPEG2 coding processing portion receiving said decoded image data from said preprocessing portion and executing said re-coding, and
said control portion controls data transformation in said postprocessing portion and said preprocessing portion on the basis of said coding information.

* * * * *